(12) United States Patent
O'Brien et al.

(10) Patent No.: US 12,248,508 B2
(45) Date of Patent: Mar. 11, 2025

(54) PERSONALIZED CONNECTIVITY USER-SPECIFIC CONTENT OFFERINGS

(71) Applicant: Viasat, Inc., Carlsbad, CA (US)

(72) Inventors: Ultan O'Brien, Carrickmines (IE); Niall O'Sullivan, Dundrum (IE); Fergal Murray, Tomhaggard (IE)

(73) Assignee: Viasat, Inc., Carlsbad, CA (US)

( * ) Notice: Subject to any disclaimer, the term of this patent is extended or adjusted under 35 U.S.C. 154(b) by 47 days.

(21) Appl. No.: 18/245,452

(22) PCT Filed: Sep. 16, 2020

(86) PCT No.: PCT/US2020/051139
§ 371 (c)(1),
(2) Date: Mar. 15, 2023

(87) PCT Pub. No.: WO2022/060357
PCT Pub. Date: Mar. 24, 2022

(65) Prior Publication Data
US 2023/0359662 A1    Nov. 9, 2023

(51) Int. Cl.
*H04N 21/214*    (2011.01)
*G06F 16/435*    (2019.01)
(Continued)

(52) U.S. Cl.
CPC ....... *G06F 16/435* (2019.01); *H04B 7/18508* (2013.01); *H04N 21/2146* (2013.01); *H04N 21/2187* (2013.01); *H04N 21/25891* (2013.01)

(58) Field of Classification Search
CPC .......... H04N 21/41422; H04N 21/251; H04N 21/258; H04N 21/4532
See application file for complete search history.

(56) References Cited

U.S. PATENT DOCUMENTS 10,595,052 B1 * 3/2020 Worley, III ........ H04N 21/8355
10,846,322 B1 * 11/2020 Ghamsari ............. H04N 21/84
(Continued)

FOREIGN PATENT DOCUMENTS

WO    WO2016/040920 A1    3/2016
WO    WO2020/027858 A1    2/2020

OTHER PUBLICATIONS

International Search and Written Opinion for PCT/US2020/051139, dated May 26, 2021, 12 pages.
(Continued)

*Primary Examiner* — Jason Salce
(74) *Attorney, Agent, or Firm* — Holland & Hart LLP

(57) ABSTRACT

Methods, systems, and devices are described for providing selectable content offerings to mobile users via mobile terminals over a satellite system. In embodiments, a database of access profiles for accessing a network via the satellite system may be maintained. Each access profile corresponds to a respective content category of a plurality of content categories and is associated with a respective set of content sources available via the network. Devices may be provided with a respective set of content categories for display based at least in part on a device-specific profile associated with the corresponding device. In embodiments, a request is received from particular device for a particular content category. An access profile may be identified from the database that is associated with the particular content offering. Communications may be permitted between the device and the respective set of content sources associated with the content category associated with the access profile.

26 Claims, 10 Drawing Sheets

(51) Int. Cl.
    *H04B 7/185*      (2006.01)
    *H04N 21/2187*    (2011.01)
    *H04N 21/258*     (2011.01)

(56) References Cited

U.S. PATENT DOCUMENTS

| | | | |
|---|---|---|---|
| 2004/0010588 A1* | 1/2004 | Slater | H04N 21/2181 |
| | | | 709/224 |
| 2008/0132212 A1 | 6/2008 | Lemond et al. | |
| 2008/0305762 A1 | 12/2008 | Malosh et al. | |
| 2014/0310271 A1* | 10/2014 | Song | G06F 3/017 |
| | | | 707/758 |
| 2017/0245298 A1 | 8/2017 | Demange et al. | |
| 2021/0067811 A1* | 3/2021 | Bates | H04N 21/41422 |

OTHER PUBLICATIONS

International Search and Written Opinion for PCT/US2020/051131 dated Jun. 29, 2021, 11 pages.

* cited by examiner

PERSONALIZED CONNECTIVITY USER-SPECIFIC CONTENT OFFERINGS

CROSS REFERENCE

The present Application for Patent is a 371 national phase filing for U.S. Patent Application No. PCT/US2020/051139 by O'Brien et al., entitled "Personalized Connectivity User-Specific Content Offerings" filed Sep. 16, 2020, which is assigned to the assignee hereof, and is expressly incorporated by reference in its entirety herein.

BACKGROUND

In a wireless communications system, a satellite communication system may provide in-flight entertainment for a number of devices communicatively coupled with the satellite terminals. The entertainment offered to the devices may be content located onboard the aircraft, such as a set of movies stored on a hard drive located on the aircraft. The content that is offered to passengers onboard the aircraft may be the same content for everyone, regardless of characteristics of the passengers or their devices. Only providing onboard content items to all passengers may be unnecessarily limited and costly when those content items are not used enough. Furthermore, not all content offerings may be applicable to or appropriate for every passenger and device.

SUMMARY

The described features generally relate to providing personalized content offerings for devices connected to a satellite terminal in a satellite communications system. In particular, personalized content offerings are provided to each customer or passenger associated with a device, wherein the content items included in the content offering are curated for that customer or passenger. The techniques described herein provide a la carte, passenger-customizable content items accessible at their own devices while onboard a mobile platform such as an aircraft. The content items may be stored on ground-based storage devices accessible by networks or may even be live streamed content items. When a content item is requested by the device, a communication session, such as a micro-session, may be established for the content item between the device and a network providing the content item via the satellite communication system. The micro-session restricts network traffic to a set of network destinations associated with the requested content item. This technique enables traffic shaping, reduces the amount of traffic over the satellite communication system, may cost less, and provides the passenger with a more customized and more cost effective experience.

Various content providers on one or more networks may provide information related to the content offerings to a carrier associated with the mobile platform. Each content offering may be personalized using one or more access profiles and device-specific profiles. The access profiles may define a set of rules for the plurality of content offerings, including the particular content offering, offered at the plurality of devices within the mobile platform. The device-specific profiles may indicate what types of content can be enabled or allowed at the particular device, such as user authorizations, the age of an associated user, applications installed at the device, subscriptions of the device or user, permissions associated with the device or user, and the like. A content offering manager, which may be located within the satellite communication system and may be specifically onboard the mobile platform, may compare a requested content offering and a requesting device to the relevant access profile and device-specific profile. If there is a match, the satellite communication system is authorized to allow access to the content item at the device. The satellite communication system may facilitate communications between the network and the device to provide the requested content item at the device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
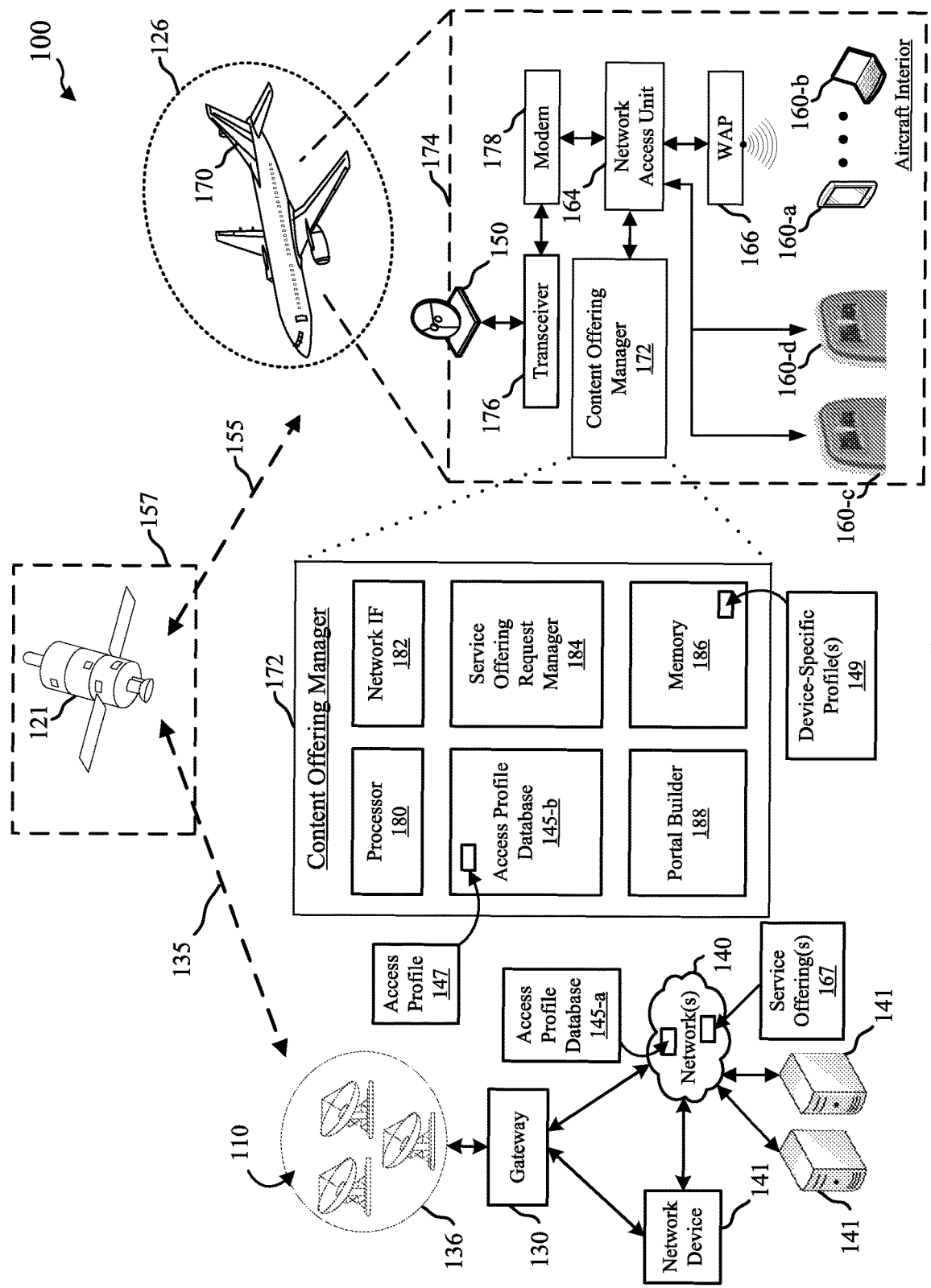
FIG. 1 shows a diagram of a wireless communication system, in accordance with aspects of the present disclosure.

A satellite terminal (e.g., a multi-user access terminal) within a satellite communication system may employ a communications antenna to establish a communications link between the satellite terminal and a communications satellite. The communications link may be configured for bi-directional communications (e.g., transmitting and receiving, etc.), or uni-directional communications (e.g., receiving), in some cases. Such a communication link may provide communication services between a ground-based network and a mobile transport that includes a satellite terminal. These communication links may be used to provide services to devices (e.g., user devices such as mobile phones and laptops) for passengers located on the mobile transport.

Techniques described herein provide customizable content offerings of content items at a device located onboard a mobile transport that has connectivity to external networks via the satellite communication system. The satellite communication system relays network traffic for the particular content item between the device and a network. According to aspects of the present disclosure, one or more networks may provide information related to content offerings to a satellite terminal. The satellite terminal may provide these content offerings to devices onboard a mobile transport associated with the satellite terminal. The satellite terminal may generate a portal for each device that is customized for that device based on a set of access profiles associated with the content offerings and device-specific profiles. The portal may show content offerings that are authorized for the device, which may be based on a characteristic of the device or an associated user of the device. Content offerings may differ between customers based on content, price, type, and the like.

When a customer selects a content item of the content offerings to access (e.g., using the generated portal), the satellite terminal may establish a micro-session between the device and the relevant network destination for that particular content item. A multi-cast live stream may stream live content items to multiple devices simultaneously. The satellite terminal may facilitate access to the content item by acting as a relay for the network activity.

This description provides examples, and is not intended to limit the scope, applicability or configuration of embodiments of the principles described herein. Rather, the following description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

FIG. 1 shows a diagram of a wireless communications system 100, in accordance with aspects of the present disclosure. Wireless communications system 100 includes a satellite communications environment, which includes a communications satellite system 157 (including one or more communications satellites 121), a satellite terminal 150, one or more devices 160, one or more satellite terminals 136, a gateway 130, and one or more networks 140. Satellite terminal 150 may be multi-user access terminals providing network access connectivity to multiple devices 160 on a mobile platform 170. Located onboard mobile platform 170 is a content offering manager 172 that provides connectivity to a content from a content offering at the devices 160. The wireless communications system 100 may be connectable to at least one user device 160 and to one or more networks 140 directly, or via one or more network devices 141.

One or more communications satellites 121 in satellite communications system may include any suitable type of communication satellite configured for wireless communication with gateway 130 and one or more satellite terminals 150. In some examples, some or all of communications satellites 121 may be in geostationary orbits, such that their positions with respect to terrestrial devices may be relatively fixed, or fixed within an operational tolerance or other orbital window. In other examples, any appropriate orbit (e.g., low Earth orbit (LEO), medium Earth orbit (MEO), etc.) for one or more satellite(s) 121 of the satellite communications system may be used.

Satellite terminal 150 may include a satellite terminal communications antenna configured for receiving and transmitting signals 155 from communications satellite 121. Satellite terminal 150 may be configured for uni-directional or bi-directional communications with one or more communications satellites 121 of satellite communications system 157.

Communications satellite 121 may communicate via signals 155 directed towards a service beam coverage area 126 that includes satellite terminal 150. Service beam coverage area 126 may cover any suitable service area (e.g., circular, elliptical, hexagonal, local, regional, national, etc.) and provide service to any number of satellite terminals 150 located within service beam coverage area 126. Likewise, communications satellite 121 may communicate via signals 135 directed towards a service beam coverage area 136 that includes one or more satellite terminals 110. Communications satellite 121 may communicate with gateway 130 by sending and/or receiving signals 135. Signals 135 may, for example, carry communications traffic for one or more satellite terminals 150 (e.g., relayed by communications satellite 121), or other communications between the communications satellite 121 and gateway 130. In some examples, communications satellite 121 may be a multi-beam satellite and may have multiple service beams covering multiple service beam coverage areas, including service beam coverage areas 126 and 136, which may or may not overlap with adjacent service beam coverage areas.

Wireless communications system 100 (including satellite communications system 157) may operate in one or more frequency bands. For example, wireless communications system 100 may operate in the International Telecommunications Union (ITU) Ku, K, or Ka-bands, C-band, X-band, S-band, L-band, and the like. Additionally, satellite terminal 150 may be used in other applications besides ground-based stationary systems, including mobile applications such as boats, aircraft, ground-based vehicles, and the like.

Satellite terminal 150 may be located on mobile platform 170, which may be any device, apparatus, or object capable of supporting satellite terminal 150 and of changing location. For example, the mobile platform may be a mobile transport carrier such as an aircraft, a space shuttle, a ship, a vehicle, or the like.

Gateway 130 may send and receive signals 135 to and from communications satellites 121 of satellite communications system 157 using one or more gateway satellite terminals 110. A gateway antenna terminal 110 may be two-way capable and designed with adequate transmit power and receive sensitivity to communicate reliably with at least one communications satellite 121. Gateway 130 may also communicate with one or more networks 140. One or more networks 140 may be part of or outside of the wireless communication system. The wireless communication system may access the one or more networks 140 using a database of access profiles 145. The one or more networks 140 may include a local area network (LAN), metropolitan area network (MAN), wide area network (WAN), or any other suitable public or private network and may be connected to other communications networks such as the Internet, telephony networks (e.g., Public Switched Telephone Network (PSTN), etc.), and/or the like. One or more network devices 141 may be coupled with gateway 130 through the one or more networks 140 and may control aspects of wireless communications system 100 in some examples. In various examples, a network device 141 may be co-located or otherwise located nearby gateway 130, or may be a remote installation that communicates with gateway 130 and/or the one or more network(s) 140 via one or more wired and/or wireless communications links. In some examples, at least some of network devices 141 are servers. Network 140 may have one or more content offerings 146 to provide to devices 160.

Aircraft communication equipment 174 may include satellite terminal 150 (which may be, be part of, or include aspects of a multi-user access terminal), a service offering manager 172, a network access unit 164, a wireless access point 166, and user devices 160-a through 160-d (collectively referred to herein as device 160). The satellite terminal 150 may include one or more mobile terminal antennas, a transceiver 176, and a modem 178. All or some of the aircraft communication equipment 162 may be located in an interior of mobile platform 170.

Mobile platform 170 includes aircraft communication equipment 174 that includes satellite terminal 150, including an antenna, which may be an antenna array. Mobile platform 170 may use an antenna of satellite terminal 150 to communicate with satellite communication system 157 via one or more signals 155. Portions of satellite terminal 150 (e.g., the antenna, transceiver 176) may be mounted on the outside of the fuselage or other location on the exterior of mobile platform 170, and may be installed under a radome. In other examples, other types of housings may be used to house portions of satellite terminal 150. Other portions of satellite terminal 150 may be on the interior of the aircraft (e.g., modem 178). Satellite terminal 150 may operate in the ITU Ku, K, or Ka-bands. Alternatively, satellite terminal 150 may operate in other frequency bands such as C-band, X-band, S-band, L-band, and the like.

Data sent over the downlink and uplink to satellite communication system 157 over the one or more signals 155 may be formatted using a modulation and coding scheme (MCS) that may be custom to the satellite or similar to others in the industry. For example, the MCS may include multiple code-points that each are associated with a modulation technique (e.g., BPSK, QPSK, 16 QAM, 64 QAM, 256 QAM, etc.) and a coding rate that is based on a ratio of the coded information bits to a total number of coded bits including redundant information.

Content offering manager 172 may be located on-board mobile platform 170 and may include a processor 180, a network interface 182, and a memory 186. Content offering manager 172 may manage different content offerings 146 among various devices, such as providing requested content offerings 146, approving requested content offerings, and whitelisting devices to communicate with associated network destinations when the content offerings 146 are accepted. Processor 180 may execute instructions stored on memory 186 to perform the functions of content offering manager 172. Memory 186 may store the instructions for the operation of content offering manager 172, local copies of media content, and an access profile database 145-b, and one or more device-specific profiles 149. In some examples, memory 186 stores a database of device specific profiles. Memory 186 may also store an index that may organize or otherwise identify content stored at memory 186.

Database of access profiles 145 may include a set of access profiles that define a set of rules for a plurality of content offerings 146. Each content offering 146 may be authorized for a particular device 160 based on an access profile of a device 160. An access profile 147 may be based on one or more characteristics of the device 160. For example, access profile 147 may show that one or more content offerings 146 may be authorized for device 160 based on a characteristic of device 160, an identity of a user associated with device 160, a subscription of device 160, a service provider of device 160, one or more characteristics of mobile platform 170 carrying device 160, specific to a flight or other travel route, communication information, a reservation identifier, a ticket identifier, an individual membership associated with device 160, a group membership associated with device 160, or a combination thereof. In other examples, the access profiles in database of access profiles 145 may be based upon other, or additional, information, qualities, or characteristics. In some examples, both network 140 and content offering manager 172 contain an access profile database 145. In other examples, just one of network 140 or content offering manager 172 has an access profile database 145. Access profile database 145-b may be queued when the wireless communication system receives a request (e.g., from device 160) associated with a content offering 146, in order to determine if access to the content offering 146 is authorized. Once device 160 selects one or more access profiles, those access profile may be associated with device 160. When device 160 requests communication with a network destination 141, the one or more access profiles associated with device 160 (which may now be device-specific profiles 149) may be queued to determine if communication is permitted.

Content offering manager 172 may also include a portal builder 188 and a content offering request manager 184. Portal builder 188 may provide a back-end ability to manage and control which services are deployed to different users or devices 160 associated with mobile platform 170 or an associated carrier. Which services are offered to each user or device 160 may be based on a set of rules unique to the user or device 160, such as the access profiles. Portal builder 188 may generate a display for a user to browse content offerings at device 160.

Content offering request manager 184 may process requests for content offerings by a device 160. In some examples, content offering request manager 184 may process selections of content offerings.

The on-board communication system of mobile platform 170 may provide communication services for devices 160 via modem 178. Devices 160 may connect to and access network 140 and content offerings through modem 178. Devices 160 may be mobile devices such as laptops or cellular phones or may be other types of devices within mobile platform 170. Devices 160 may communicate with the modem 178 via network access unit 164, which may provide network services such as DNS, IP address management (e.g., dynamic host configuration protocol (DHCP)), network address translation (NAT), and the like. Devices 160 may connect with network access unit 164 via wired or wireless connections. For example, devices 160 may connect to network access unit 164 via wireless access point (WAP) 166, which may provide wireless connectivity within mobile platform 170. The wireless connectivity may be, for example, according to a wireless local area network (WLAN) technology such as IEEE 802.11 (Wi-Fi), or other wireless communication technology.

In the example of FIG. 1, two devices 160-a and 160-b are shown as wireless user devices and two devices 160-c and 160-d are shown as fixed devices. A device 160-a or 160-b may be a mobile device such as a wireless device, a remote device, a handheld device, a subscriber device, or some other suitable terminology, where the "device" may also be referred to as a unit, a station, a terminal, or a client. Devices 160-a or 160-b may also be a personal electronic device such as mobile phones, personal digital assistants (PDAs), tablet computers, laptop computers, personal computers, other handheld devices, netbooks, notebook computers, display devices (e.g., TVs, computer monitors, etc.), printers, or other types of customer premises equipment (CPE), and the like. Devices 160-c and 160-d may be devices installed within mobile platform 170, such as a display screen or monitor on the back of a seat. In other examples, other numbers of devices 160 may be included.

A device 160 may generate a request for a content offering. For example, a user associated with device 160 may use connectivity provided by WAP 166, network access unit 164, and satellite terminal 150 to obtain a content offering and browse any available content items or other services. Upon selecting a content offering to accept, the user may prompt device 160 to send a request for the content offering, which may identify any selected content items or services and any other relevant information including requested features, duration of the content, related content, recommended content, and the like. Network 140 may provide the content offering to device 160 and may also provide the content item to device 160.

The wireless communication system may use techniques described herein to provide curated content offerings to each device onboard a mobile transport. The content offerings may be al a carte offerings that a user associated with device 160 may select from. Wireless communications system 100 may provide communications between the onboard devices and ground-based networks that hosts the content item in the content offerings. These techniques may reduce costs, provide more personalized and relevant content items to passengers, and may reduce network traffic.

Figure 2:
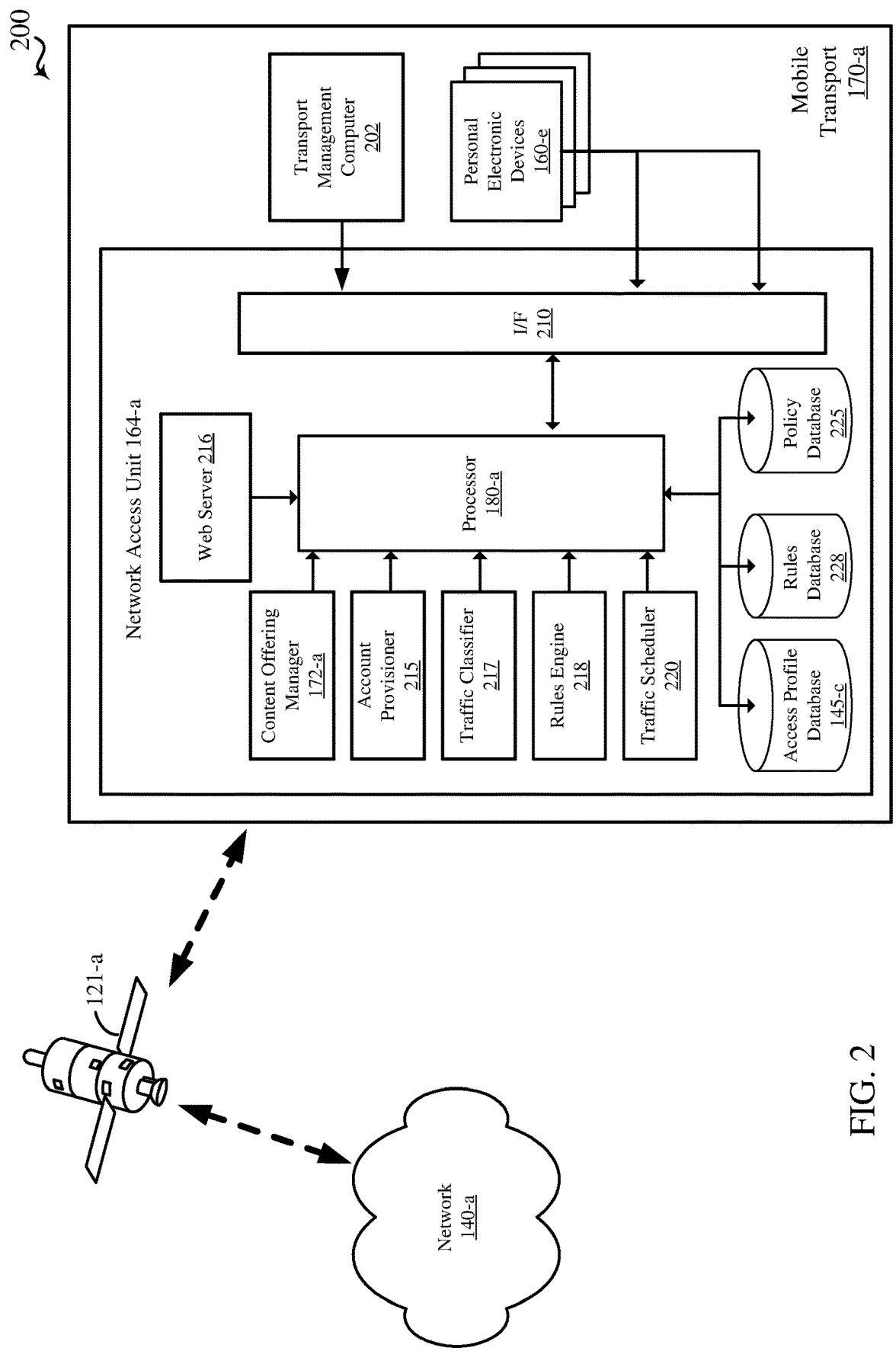
FIG. 2 shows a diagram of an in-transport media delivery system, in accordance with various aspects of the present disclosure.

FIG. 2 shows a diagram of an in-transport media delivery system 200, in accordance with various aspects of the present disclosure. In-transport media delivery 200 includes a wireless communication system, including at least one satellite 121-a, a network 140-a, and communication equipment of a mobile transport 170-a. The one or more networks 140-a may be outside of the wireless communication system and may be ground-based, terrestrial networks. The satellite 121-a, the mobile platform 170-a, and the one or more networks 140-a may be an example or include aspects of the satellite 121, the mobile platform 170, and the one or more networks 140 of FIG. 1, respectively.

FIG. 2 shows another view of the wireless communications system 100 including a detailed block diagram of one example embodiment of the network access unit 164-a. Many other configurations of network access unit 164-a are possible having more or fewer components. While shown as a single physical computing device in FIG. 2, in some aspects, one or more of the functions discussed below with respect to the network access unit 164-a may be performed by multiple different physical computing devices. In some aspects, the network access unit 164-a may include fewer functional components than shown in the example of FIG. 2. Moreover, the functionalities described herein can be distributed among the components in a different manner than described.

In some aspects, network access unit 164-a provides gateway functionality between the personal electronic devices 160-e on mobile transport 170-a and network 140-a or network destinations 141 discussed above with respect to FIG. 1. In some examples, personal electronic devices 160-e may be examples of one or more aspects of devices 160 as described in FIG. 1. In some aspects, all network traffic transmitted by and/or received by personal electronic devices 160-e may be processed by the network access unit 164-a. For example, in some aspects, network traffic transmitted to a personal electronic device 160-e from devices within network 140-a may be electronically received by network access unit 164-a, which then forwards or retransmits the network traffic to personal electronic devices 160-e according to one or more policies. Similarly, in some aspects, network traffic transmitted to devices on network 140-a by personal electronic devices 160-e may be electronically received by network access unit 164-a, which then may forward or retransmit the network traffic to destinations indicated in the network traffic (for example, to destinations within network 140-a) based on one or more policies.

Consistent with FIG. 1, an in-transport network access unit 164-a is in communication, via satellite 121-a (or other suitable communications network, as described above) and other components of a two-way communication system such as that shown in FIG. 2, with a terrestrial based network 140-a. Network access unit 164-a may also be in communication with personal electronic devices 160-e and, in some aspects, a transport management computer 202. In FIG. 2 and the following discussion, gateway 130 and some components (e.g., satellite terminal 150, transceiver 176, modem 178, and WAP 166, etc.) of the wireless communication system 100 discussed above with respect to FIG. 1 are omitted to avoid over complication of the drawing.

The illustrated aspect of network access unit 164-a includes an electronic hardware processor 180-a and a network interface 210. Processor 180-a may be in communication with network interface 210 via an electronic bus within network access unit 164-a. Processor 180-a may communicate with network interface 210 to transmit and/or receive packets over a network, such as a network providing connectivity to the wireless access point 166 and/or modem 178 discussed above with respect to FIG. 1. Processor 180-a may also communicate over network interface 210 to exchange network messages with a personal electronic device 160-e and/or a transport management computer 202.

Network access unit 164-a also includes an account provisioner 215, a web server 216, a traffic classifier 217, a rules engine 220, a traffic scheduler 220, and a content offering manager 172-a. The account provisioner 215, web server 216, traffic classifier 217, rules engine 220, traffic scheduler 220, and content offering manager 172-a may be portions of a volatile or stable storage, such as a virtual or physical memory space accessible to processor 180-a. The account provisioner 215, web server 216, traffic classifier 217, rules engine 218, traffic scheduler 220, and content offering manager 172-a may include binary data defining instructions that configure the processor 180-a to perform various functions. For example, the account provisioner 215 may include instructions that configure processor 180-a to provision access to network 140-a by one or more of the personal electronic devices 120a-n.

Web server 216 may store instructions that configure processor 180-*a* to provide functionality associated with delivering electronic content via web standards, such as html/http. Traffic classifier 217 may include instructions that configure processor 180-*a* to classify network traffic received by network access unit 164-*a*. For example, traffic classifier 217 may determine whether traffic is email, web browsing traffic, video streaming traffic, messaging traffic, or other types of traffic. This information may be used to determine whether the traffic is allowed by a traffic policy as discussed in more detail below.

Rules engine 218 may include instructions that configure processor 180-*a* to execute one or more rules that assign a traffic policy to a personal electronic device 160 based on one or more characteristics of the network device. Traffic scheduler 220 may include instructions that configure processor 180-*a* to schedule network traffic generated by personal electronic devices 160-*e*. Instructions in one or more of account provisioner 215 and/or traffic schedule 220 may configure processor 180-*a* to read data from a policy database 225. For example, in some aspects, processor 180-*a* may read data from policy database 225 and rules database 228 in order to determine a traffic policy to apply to network traffic generated by one or more of personal electronic devices 160-*e*.

While FIG. 2 shows network access unit 164-*a* as one physical device, one of skill in the art would understand that in some aspects, the functions discussed above and below relating to network access unit 164-*a* may, in some implementations, be implemented on multiple physical devices. For example, in some aspects, functionality associated with each of the account provisioner 215, web server 216, traffic classifier 217, rules engine 218, traffic scheduler 220, and content offering manager 172-*a* may each be provided on a separate physical device having its own dedicated electronic hardware processor, memory, and network interface. Additionally, in some implementations, policy database 225, rules database 228, and access profile database 145-*c* may also be implemented on separate devices from one or more of the account provisioner 215, web server 216, traffic classifier 217, rules engine 218, and traffic scheduler 220. How the functionality discussed above and below is partitioned across one or multiple physical hardware devices does not substantially affect the methods and systems disclosed herein. While FIG. 2 shows policy database 225, rules database 228, and access profile database 145-*c* included as part of network access unit 164-*a*, in some other implementations, these components may be accessible via network 140-*a*. In some of these aspects, network access unit 164-*a* may be configured to cache at least a portion of policy data 225, rules database 228, and/or access profile database 145-*c* in a local memory to provide for reliable and performant access to data contained therein.

Figure 3:
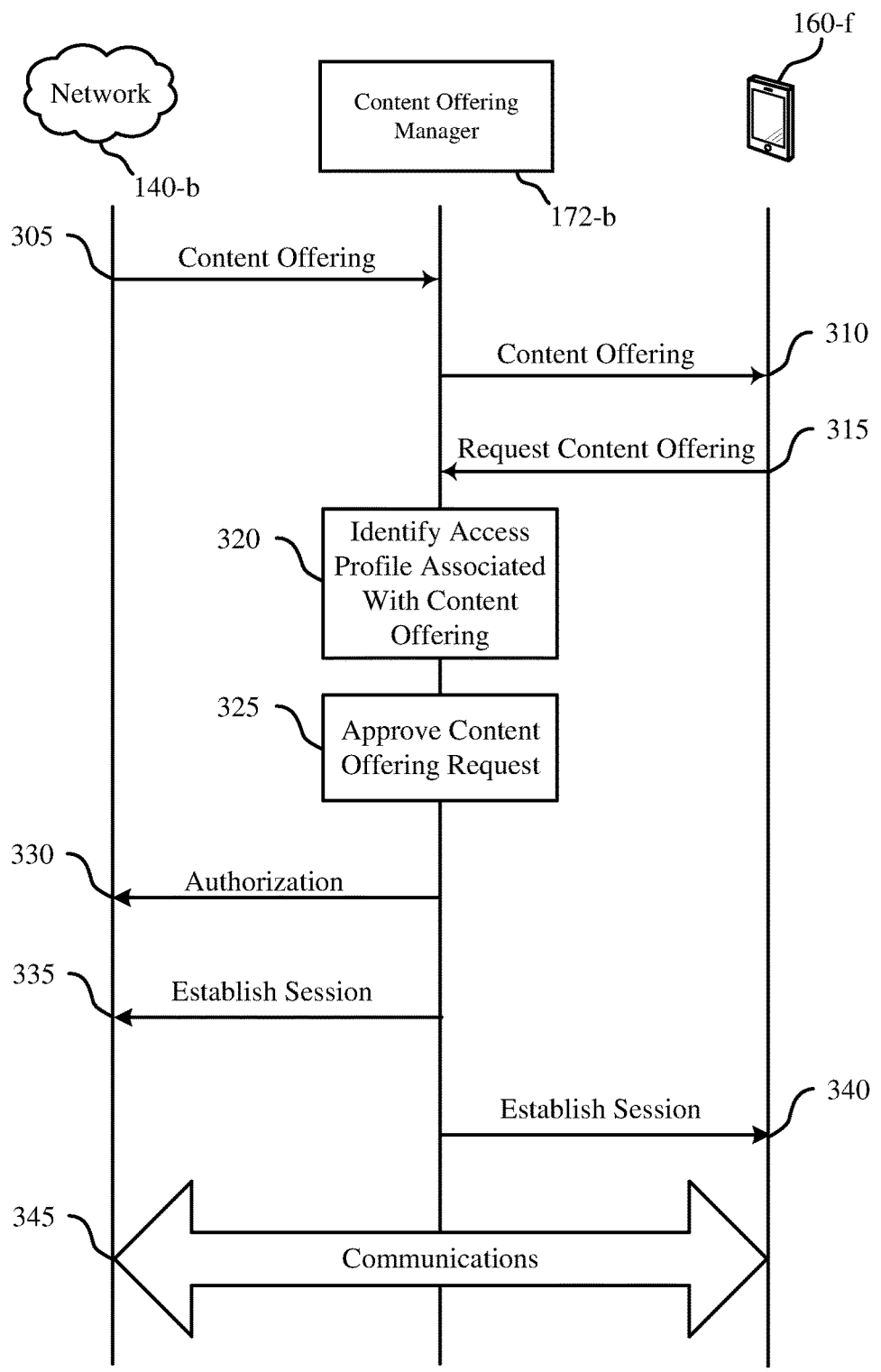
FIG. 3 shows a process flow diagram of an example for providing content offerings, in accordance with aspects of the present disclosure.

FIG. 3 shows a process flow diagram 300 of an example for providing content offerings, in accordance with aspects of the present disclosure. The process flow diagram 300 shows example communications between a content offering manager 172-*b* (for example of a wireless communication system that includes one or more satellites), a network 140-*b*, and a device 160-*f*. The wireless communication system may include aspects of the wireless communication systems of FIGS. 1 and 2, for example the content offering manager 172-*b*, the network 140-*b*, and the device 160-*f* may be aspects of the content offering manager 172 and 172-*a*, the network 140 and 140-*b*, and the devices 160-*a* to 160-*d* and 160-*e* of FIGS. 1 and 2, respectively. In some examples, the device 160-*f* may be located on a mobile platform, such as an aircraft.

The network 140-*b* may represent one or more networks. The network 140-*b* may provide information related to one or more content offerings 305 to the content offering manager 172-*b*. The content offering may be an offer for different content, such as media content, that is personalized for a particular carrier, mobile transport, user, or device. In some examples, the content offering is based on a route, a sector, a base, or an area of an associated carrier. In some examples, the content offerings may be dynamically changed to personalize them to a carrier, a user, or a device. A carrier may be any person or company that transports people or goods, such as an airliner that has a fleet of aircraft, or a company with a fleet of ships, for example.

The content offerings may be associated with an access profile for a plurality of devices 220-*a*. That is, each content offering may be authorized for a particular device 160-*f* based on an access profile of the device 160-*f*. The access profile may define a set of rules for a plurality of content offerings, and may be based on one or more characteristics of the device 160-*f*. For example, the access profile may be based on a preference of a user associated with the device, a characteristic of the user, a subscription status of the user, a profile of the user, demographic information of the user, group membership of the user, communication information associated with the user, a reservation number associated with the user, a ticket number associated with the user, or a combination thereof, wherein the access profile is identified based at least in part on the determined preference. In some examples, the access profile may show that one or more content offerings may be authorized for the device 160-*f* based on an identity of a user associated with the device 160-*f*, a subscription of the device 160-*f*, a service provider of the device 160-*f*, one or more characteristics of a mobile platform carrying the device 160-*f*, specific to a flight or other travel route, communication information, a reservation identifier, a ticket identifier, an individual membership associated with the device 160-*f*, a group membership associated with the device 160-*f*, or a combination thereof. In other examples, the access profile may be based upon other, or additional, information, qualities, or characteristics.

Once the content offering manager 172-*b* is provisioned with or has access to the one or more content offerings, the content offering manager 172-*b* may provide information related to the content offerings to the device 160-*f* in a content offering information signal 310. Information in the content offering information signal 310 may include identifying information for each content offering, including what type of content is offered, any networks associated the with offered content, any applications or services that may be included or required to access the content item (e.g., such as a media player), the terms of the content offering, any expiration of the content offerings, and the like. The content offering information signal 310 may be provided to the device 160-*f* upon request or upon connection of the device 160-*f* to a network of the mobile platform. The content offering information signal 310 may be generated at the satellite 121-*b* or at the network 140-*b*. In some examples, the satellite 121-*b* may provide a different content offering to each different device associated with the mobile platform.

The device 160-*f* may send a request for a content offering signal 315 to the content offering manager 172-*b*. For example, a user associated with the device 160-*f* may browse the one or more content offerings available for the device 160-*f*. Upon selecting a content offering to accept, the user may prompt the device 160-*f* to send the request for the content offering signal 315, which may identify the selected content offering and any other relevant information including requested features, duration of the content, related content, recommended content, and the like.

Upon receiving the request for the content offering signal 315, the content offering manager 172-*b* may identify an access profile associated with the particular selected content offering. That is, the content offering manager 172-*b* may identify an access profile from a database of access profiles at 320, wherein the particular access profile is associated with the content offering. Based upon the relevant access profile, the content offering manager 172-*b* may determine that communications are permitted between the device 160-*f* and a respective set of network destinations associated with the identified access profile for the content offering. In some examples, the content offering manager 172-*b* may approve the content offering request at 325 based on the access profile. In other examples, the content offering manager 172-*b* may determine that the access profile does not allow for approval of the content offering for the device 160-*f*. In such a case, the content offering manager 172-*b* may deny the request for the content offering 315.

If the content offering manager 172-*b* determines that the content offering is approved based upon the access profile, the content offering manager 172-*b* may send an authorization signal 330 to the network 140-*b*. The network 140-*b* and the content offering manager 172-*b* may establish a communication session 335, and in turn, the content offering manager 172-*b* may establish a communication session 340 with the device 160-*f*. In some examples, the communication sessions 335 and 340 may be micro-sessions. A micro-session may be a session that is restricted to the content offering, and may also be restricted to the respective set of network destinations associated with the identified access profile or content offering. The communication sessions 345 and 350 may provide the content to the device from a network that can access or otherwise stores the content. The communication sessions 335 and 340 may be two-way communication sessions, where communications 345 between the device 160-*f* and the network 140-*b* are relayed via the content offering manager 172-*b*. In other words, the content offering manager 172-*b* provides a communication service to the device 160-*f* within a mobile platform via the wireless communication system.

Figure 4:
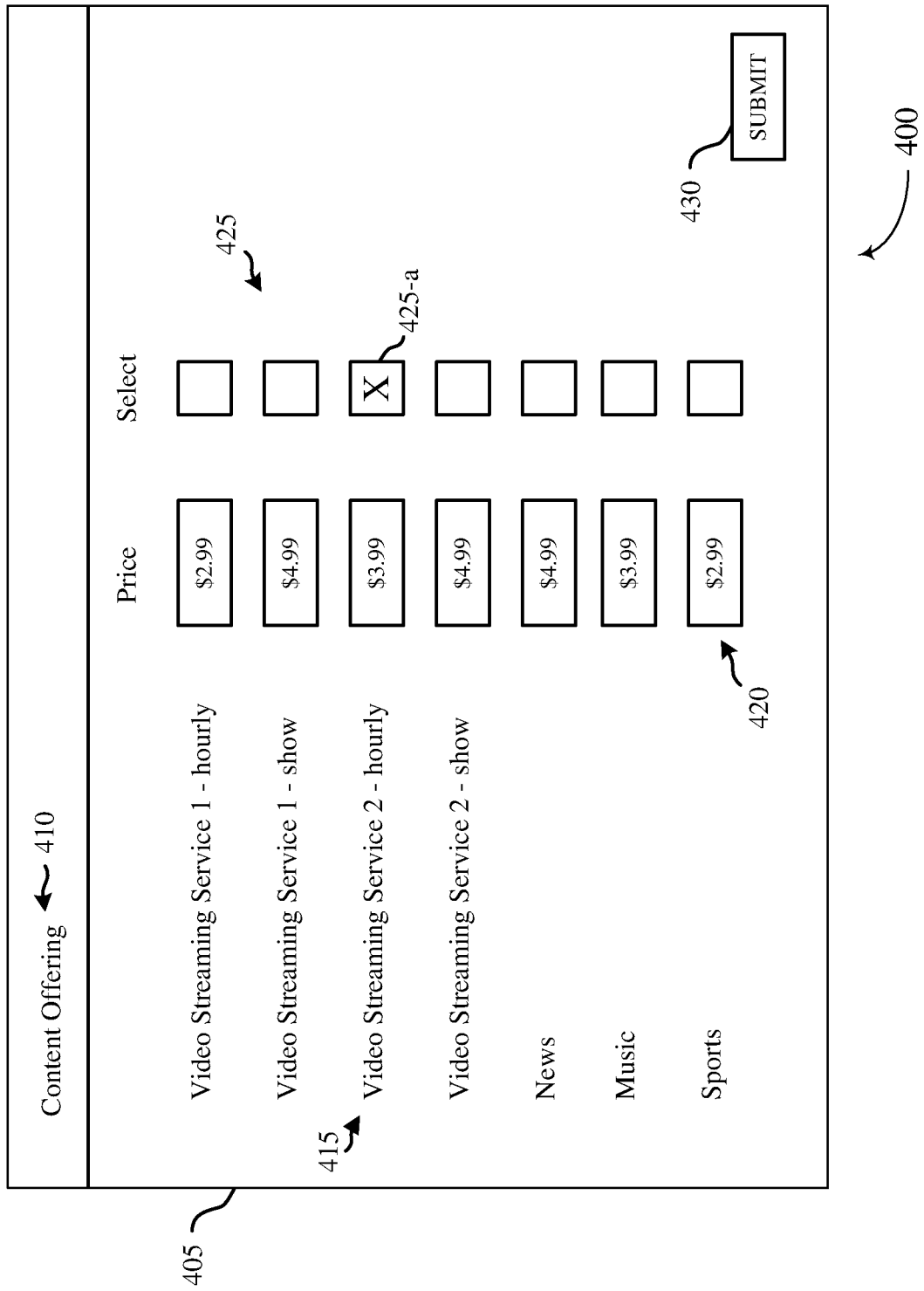
FIG. 4 shows an example screenshot of a portal for a plurality of content offerings, in accordance with aspects of the present disclosure.

FIG. 4 shows an example screenshot 400 of a portal 405 for a plurality of content offerings 410, in accordance with aspects of the present disclosure. The portal 405 may be displayed at a display screen of a device, such as a device 220 as in FIGS. 2 and 3. The portal 405 may be displayed at a mobile device onboard a mobile transport or may be displayed at a screen of a terminal fixed on the mobile transport. The screenshot 400 is merely one example of many possible different screenshots and alternatives for the portal 405.

Portal 405 may include an identifier 410 that shows that the portal 405 shows one or more content offerings. Portal 405 may be generated by portal builder 188 as shown in FIG. 1. A micro-session may be established for any selected content offering. As used herein, a micro-session may include access to only a portion of the Internet or other network-based service, wherein the portion is related to particular content identified in a content offering. Portal 405 may include a list of content categories 415 and prices 420. Content categories 415 may include one or more different types of services that offer different types of content items. Example content categories 415 are listed in the portal 405, as well as example prices 420. For example, content categories shown in the example of the portal 405 may include two different video streaming services (e.g., Netflix, Amazon Video, Hulu, etc.) which may be accessed on-demand via two different methods. First, the streaming service may be accessed for a particular time duration, such as on an hourly basis, with multiple content available during the time. Second, the streaming service may be accessible on-demand for a particular show, movie, series, etc., for example. Other content categories 415 include access to a news broadcaster, a music streaming service, or sporting events. Some of the content offerings may include live content that requires real-time streaming of the content. In some examples, the satellite communication system may perform multi-cast streaming. That is, two or more different live feeds may be streamed to two or more different devices onboard the mobile transport at the same time. In other examples, other content offerings may be included, which may have more or fewer content offerings than shown in the example of FIG. 4.

Portal 405 may also include one or more request options 425, such as radio buttons, where the user of the device may select a content offering. As shown in FIG. 4, request option 425-*a* has been selected by placing an X in request option 425-*a*, which selects the associated content offering named music. A submit button 430 may be selected to provide a request for the content offering to the wireless communication system. If authorized, the device may be able to connect to the content via the wireless communication system.

While example portal 405 is shown simply as a line drawing, other examples may include graphics, videos, colors, graphics interchange formats (GIFs), icons, or the like. Other options or features may also be included, such as options to submit, cancel, update content offerings, or the like. In some examples, the portal 405 is a webpage, rendered by a web browser. In other examples, the portal 405 is a graphical user interface (GUI) for another type of application.

Figure 10:
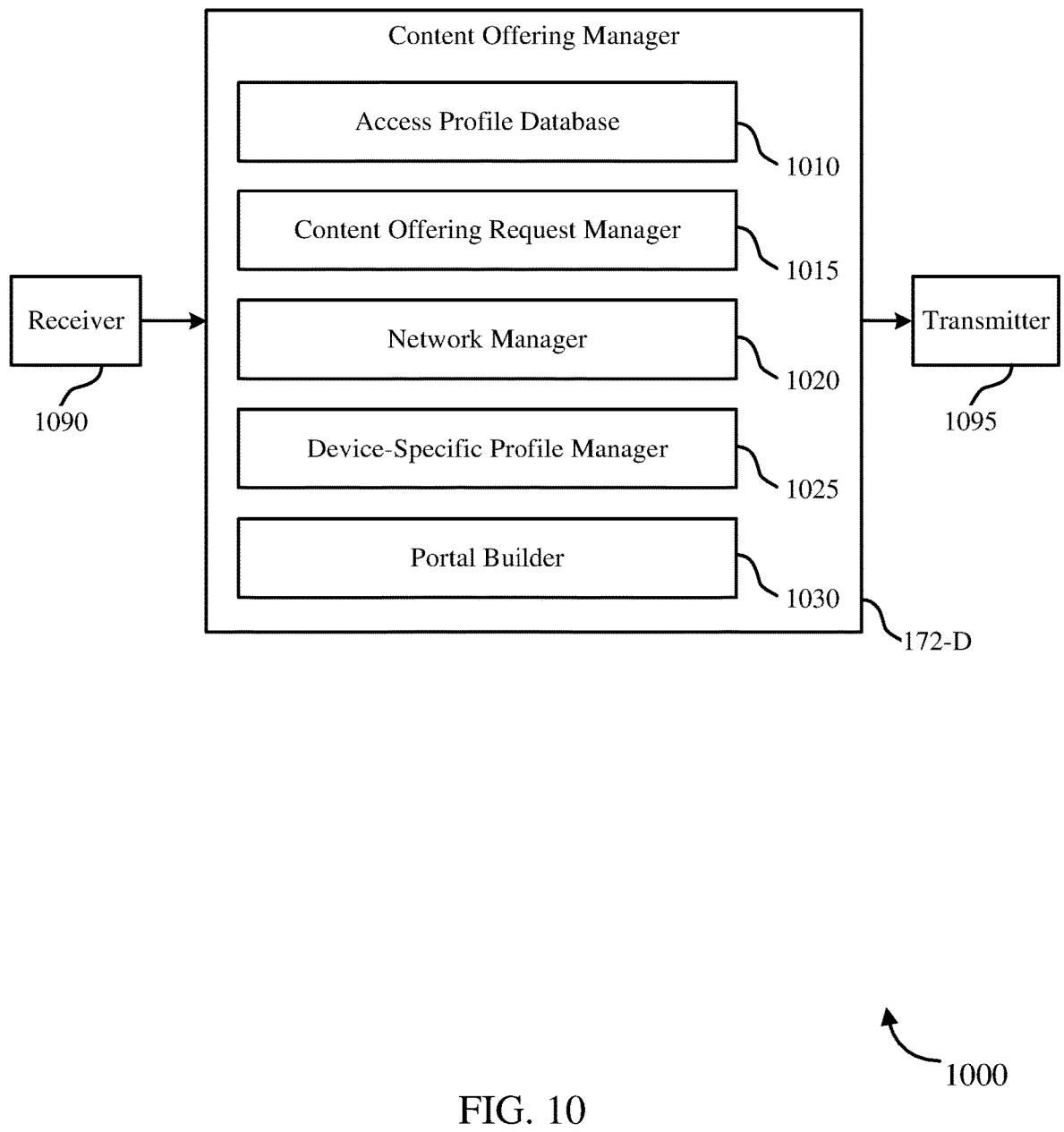
FIG. 10 shows a block diagram of a content offering manager, in accordance with aspects of the present disclosure.

In some examples, portal 405 may be generated at a portal builder of a content offering manager, such as the content offering manager 1005 as shown in FIG. 10. The portal builder may be hosted within the wireless communication system, which may be at a satellite gateway or a satellite terminal, for example. The portal builder may provide a back-end ability to manage and control which content is deployed to different users or devices associated with the carrier. Which content is offered to each user or device may be based on a set of rules unique to the user or device, such as the access profile or a device-specific profile. The access profile rules may be changed or updated based on changes at the provider offering the content or changes to something associated with the carrier, user, or device (such as, for example, a subscription status, a service provider, a location, a route, local competitors, market changes, license changes, applications installed on the device, etc.). Prices may also differ between different devices as well, which may be based on things like enrollment in a loyalty program, the identity of a service provider of the device, existing subscriptions, current promotions, related or recommended content, and regions, among other factors.

Portal 405 may provide a back-end technique for dynamically determining personalized content offerings for a plurality of devices. The content offerings that are displayed on portal 405 may be personalized for each device, which may, for example, be based on current subscriptions and installed applications. Portal 405 may be different for different users. Portal 405 may provide a more unique and streamlined experience for a user, such as offering content that is relevant to that user and at relevant prices. A user may save time browsing through many different content offerings when using the techniques described herein, since more relevant content offerings may be more prominently displayed. In some examples, a user may also save money by only paying for the particular content that they want to see, hear, or otherwise experience, instead of having to pay a higher price for full access to the network or all the content of a particular service. Traffic in the network may also be reduced using these techniques.

Figure 5:
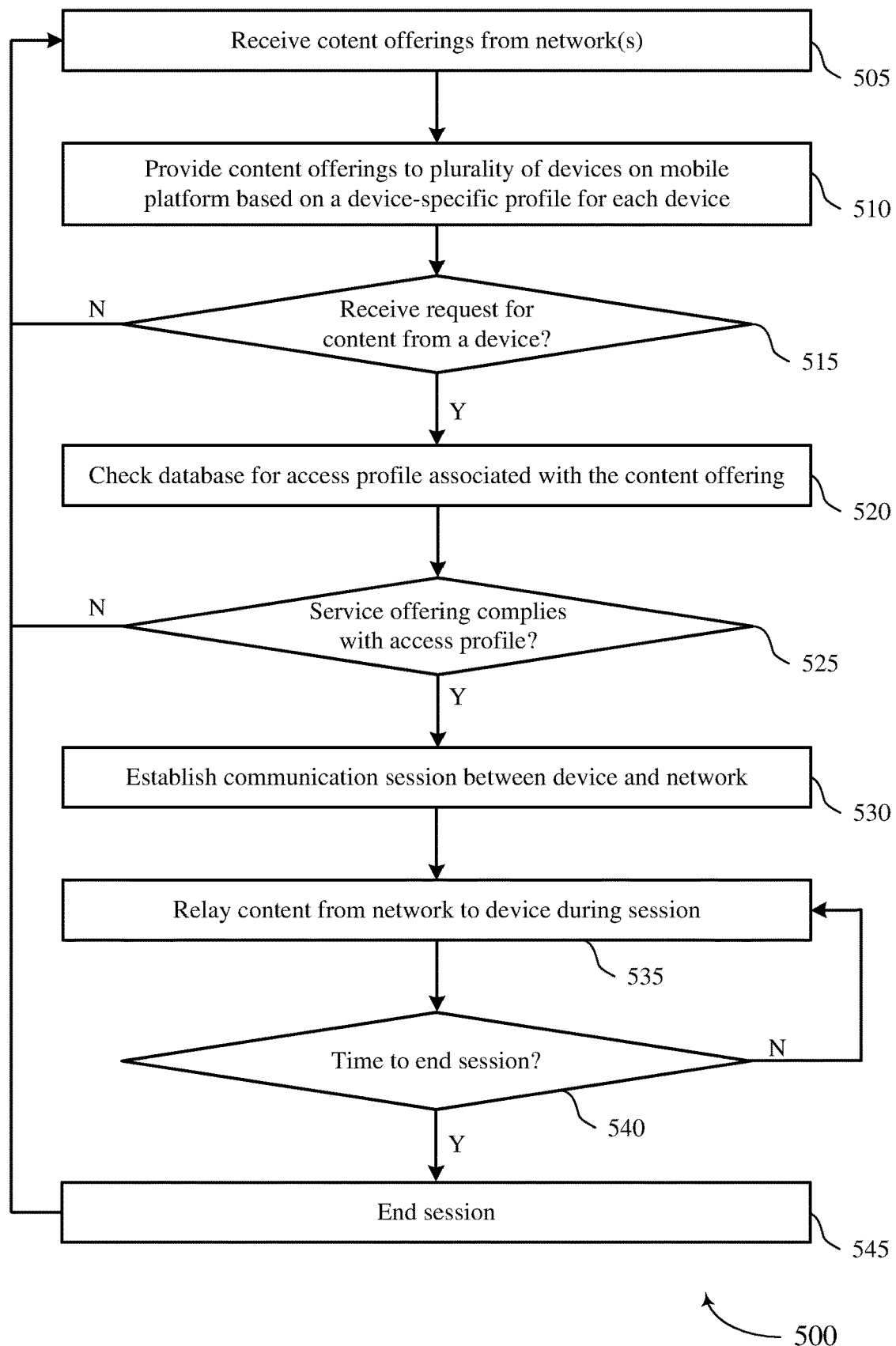
FIGS. 5 through 8 show flowcharts illustrating exemplary methods for personalized connectivity content offerings, in accordance with aspects of the present disclosure.

FIG. 5 shows a flowchart illustrating an exemplary method 500 for personalized connectivity content offerings with respect to a wireless communication system, in accordance with aspects of the present disclosure. In some examples, the wireless communication system may be a or include aspects of a wireless communication system as described with respect to FIGS. 1-4.

At 505, one or more content offerings may be received at the wireless communication system from one or more networks. The content offerings may be device-specific offers for device-specific access to one or more content items provided by a respective set of network destinations within the network. The content offerings may be valid for a specific time period or may be real-time offers. The content offerings may be generated based on a carrier, a route, a region, etc. of the mobile platform. At 510, the method 500 includes providing the content offerings to a plurality of devices on the mobile platform. In some examples, the method 500 further includes providing device-specific profiles to the network for each device on the mobile platform. In some examples, a device-specific profile database or an access profile database may be consulted before the content offerings are provided to the plurality of device in order to further personalize the content offerings to the specific devices.

At 515, the method 500 includes determining whether a request has been received from a device for a particular content. If not, the method 500 continues to receive updated offerings from the network and provide those offerings to the devices. If a request for access to a content offering is received, the method 500 proceeds to 520.

At 520, the access profile database is queried to determine the rules associated with the particular device accessing the particular content. At 525, the method 500 determines whether the access profile associated with the content offering and the device allow connection to the content. If the content offering complies with the access profile, the method 500 may proceed back to updating its content offerings or providing updated content offerings to the device. However, if the content offering does comply with the access profile, the device may be authorized to access the content by the wireless communication system. At 530, a communication session may be established between the device and the network, with the wireless communication system acting as a relay. The communications session may be a micro-session.

At 535, the method 500 may include the wireless communication system relaying the content and other communications between the device and the network during the session. If the method 500 includes receiving an indication or a request to end the session at 540, either from the device or the network, the session may be ended at 545. In other examples, the session may be associated with a session timer, and when the user finishes watching a show, or a live streaming event is completed, the session may time out after expiration of the session timer. If not, the method 500 continues to support communications between the device and the network until the session is ended. The method 500 may repeat or be performed in parallel for different devices connecting to the wireless communication system, as well as for updated content offerings.

Figure 6:
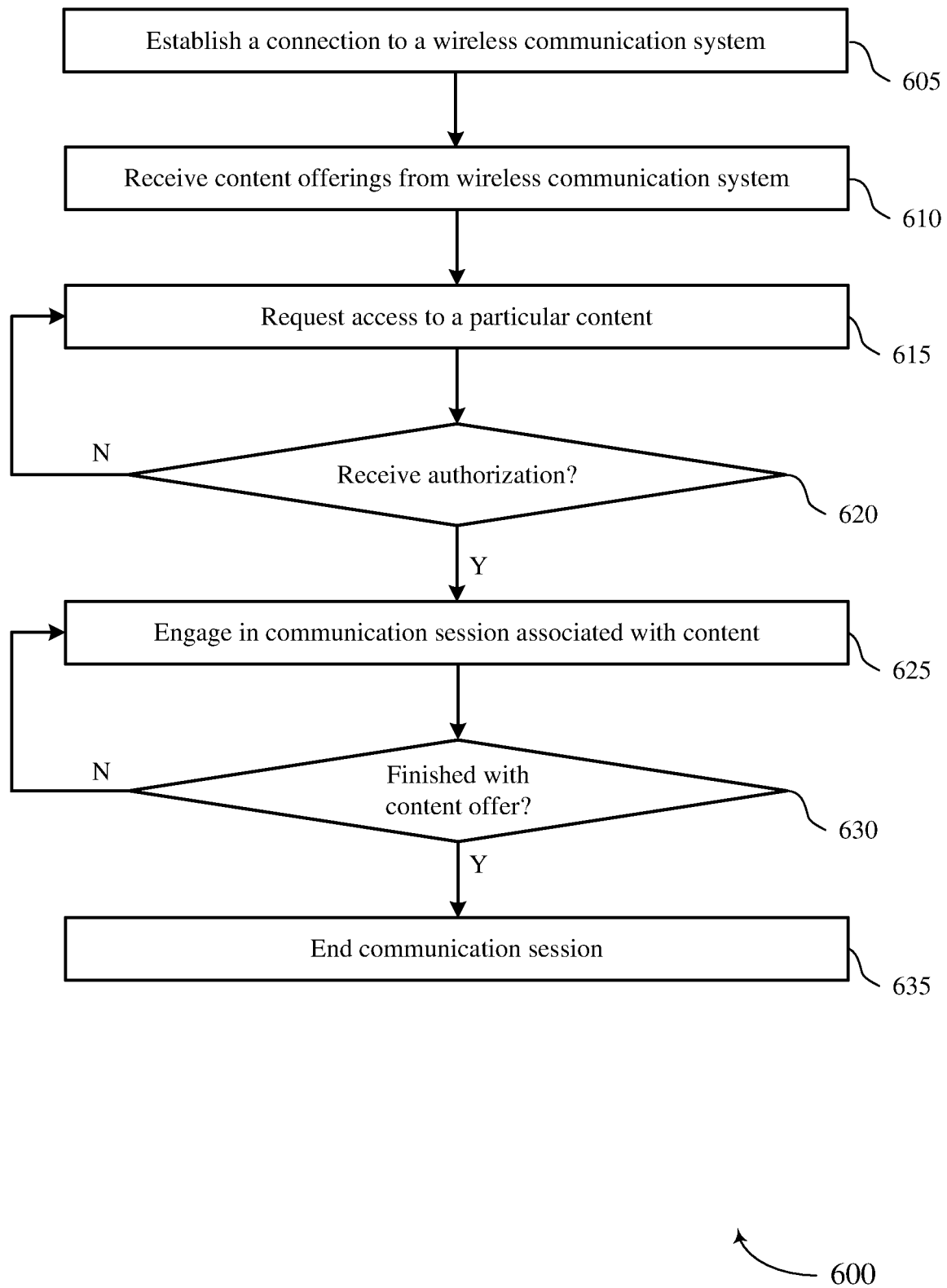

FIG. 6 shows a flowchart illustrating an exemplary method 600 for personalized connectivity content offerings with respect to a device, in accordance with aspects of the present disclosure. In some examples, the device may be a device 160 or a device 220, such as a mobile device or any other type of device, as described with respect to FIGS. 1-3.

At 605, the method 600 may include establishing a connection to a wireless communication system, for example a wireless communication system including one or more aspects described with respect to FIGS. 1-5. This may be, for example, a mobile device connected to a Wi-Fi network on a mobile transport character, for example the Wi-Fi network in communication with a satellite communication system to connect with a network. The device may receive content offerings from the wireless communication system and display (or orate, etc.) them at 610. A user of the device may select a content offering to access, and the device sends a request for the particular content to the wireless communication system at 615.

If, at 620, authorization for the content offering is denied, the method 600 may return to 615, where the user may be able to select another type of content. However, if authorization for the content is accepted, the method proceeds to 625. At 625, the device engages in a communication associated with the content offering that is hosted by the wireless communication system, which may be a micro-session. The device may continue to engage in the micro-session until an indication that the content is finished, at 630. The content may be finished if the user decides to end use of the content, the content is completely streamed, the content offer expires, or the provider of the content offering indicates the service is over, or the like. At 635, the communication session may be ended based upon the indication.

In one use case, for example, a user may be onboard an aircraft flying a particular route. The user may connect their mobile phone to the Wi-Fi network onboard the aircraft. Upon connecting to the Wi-Fi network, a wireless communication system also connected to the Wi-Fi network, or including the Wi-Fi network, may identify one or more content offerings and compare them to a device-specific profile for the mobile phone and an access profile associated with the content offering. Based on the content offerings and the access profile, the wireless communication system may generate, at the back-end, a portal for the mobile phone that identifies the particular, personalized content offering. The wireless communication system may present the content offering in the form of the portal to the mobile phone. The user may be able to access the portal on their mobile phone, browse the offerings, and select which content they would like to access. The mobile phone requests access to the associated content via on-board Wi-Fi, which relays the request to the wireless communication system. The wireless communication system, specifically a satellite terminal (which may be co-located at the aircraft or on the ground), may further confirm the mobile device's access to the content. Once approved, the wireless communication system facilitates communications between the mobile device and the network that hosts the content, which may be located on the ground. The mobile device gets access to the content, but not necessarily other content, services or network sites, via the relayed communications.

Figure 7:
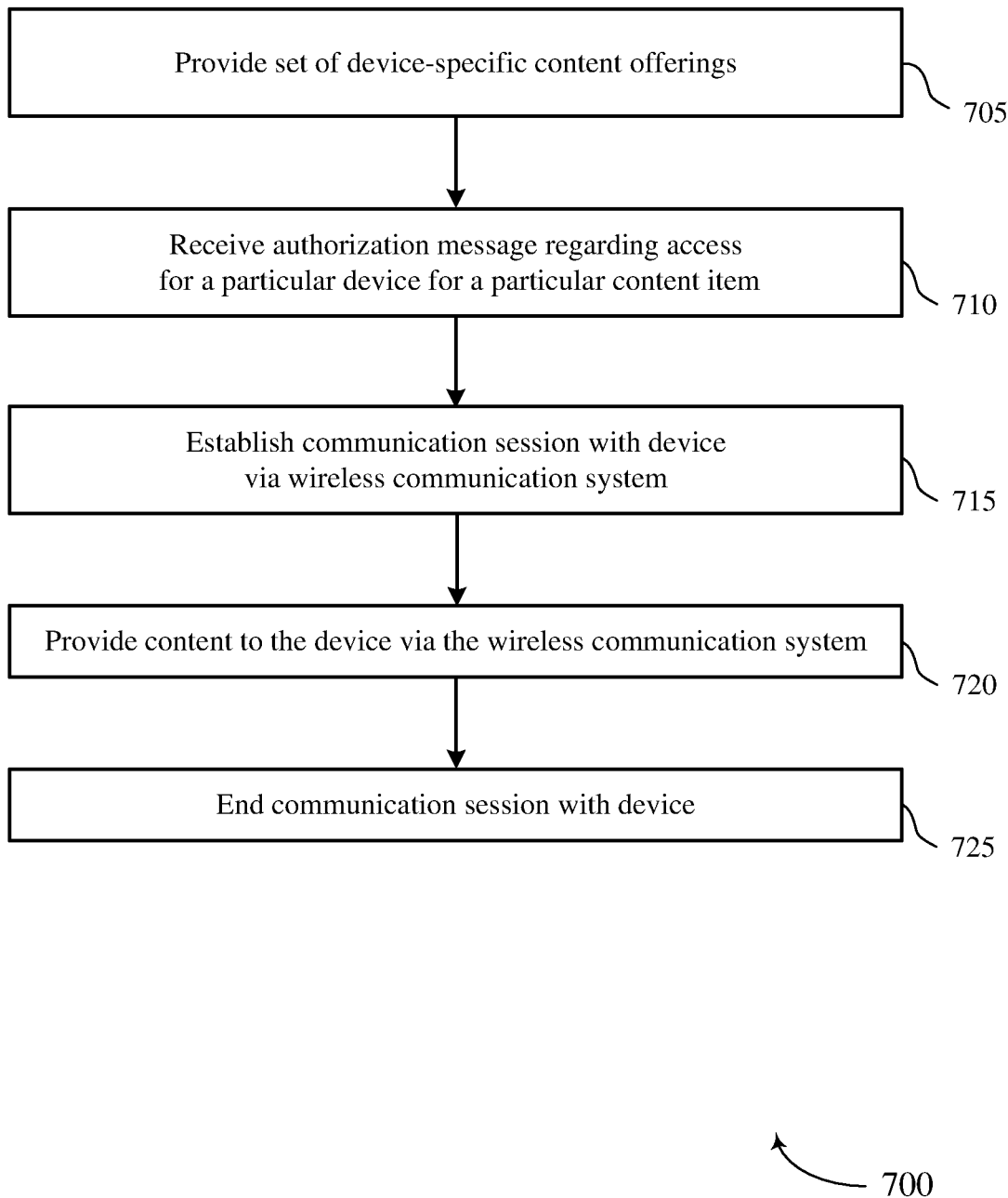

FIG. 7 shows a flowchart illustrating an exemplary method 700 for personalized connectivity content offerings with respect to a network hosting the content offering, in accordance with aspects of the present disclosure. In some examples, the network may be, for example, a network 140 as described with respect to FIGS. 1-3.

At 705, the method 700 may include providing a set of device-specific content offerings to a carrier via a wireless communication system. Each content offering may be associated with a set of respective network destinations. The content offerings may be for an online media item, live event, or the like. The network may provide the set of content offerings periodically, upon request, or whenever there is a change in the content offerings, for example. The set of content offerings may detail what content items are being offered for access, prices, any restrictions, etc., and may also be based upon particular characteristics of the associated carrier or mobile transport.

At 710, the network may receive an authorization message regarding a particular device that wants access to a particular content item. This may be received immediately after providing the set of content offerings, or may be received at a later time. The authorization message may indicate that the device has authorization, via the relevant access profile, to access the particular content item.

At 715, a communication session is established between the device and the network via the wireless communication system, which may be a satellite communication system. The communication session may be a micro-session, which means only those network destinations associated with the particular content may be accessible by the device. The network communicates with the device via the wireless communication system at 720 to provide the content item to the device, until the communication session is ended at 725. The communication session may be ended by the device, the network, or the wireless communication system (e.g., a device of the wireless communication system).

Figure 8:
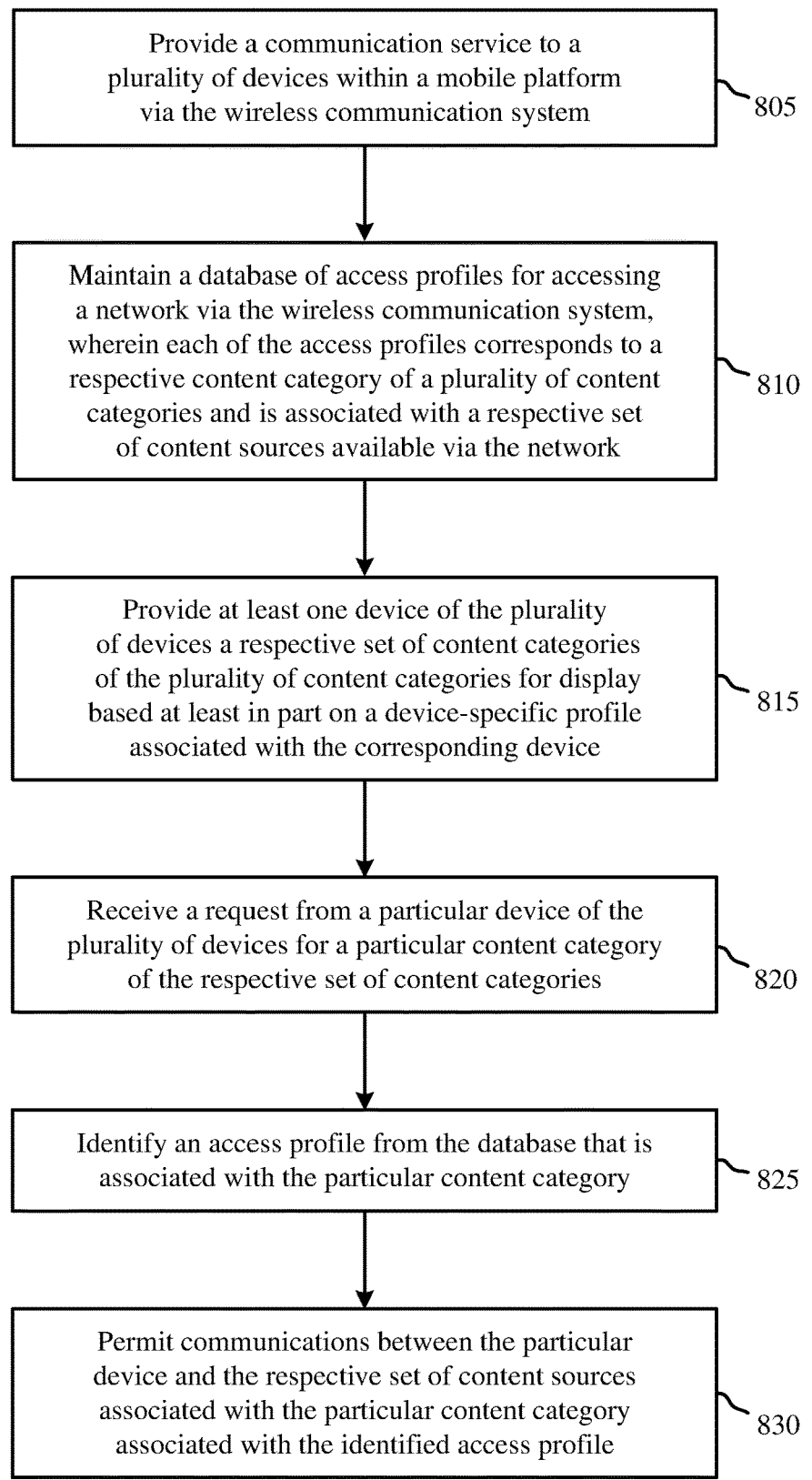

FIG. 8 shows a flowchart illustrating an exemplary method for personalized connectivity user-specific content offerings, in accordance with aspects of the present disclosure. Some or all of the steps of the exemplary method 800 may be performed by various devices of a wireless communications system, for example one or more of a satellite terminal 150, a communications satellite 121 of a satellite communications system, a gateway 130, and/or a network device 141 of a satellite communications system, as described with reference to FIGS. 1-3. In the description of method 800, one or more devices of the wireless communications system may perform each of the described steps. In some examples, one device of the wireless communications system may perform the steps. In other examples, one or more steps may be performed by a first device, while a second device may perform one or more other steps of method 800.

At 805, the method 800 may include providing a communication service to a plurality of devices within a mobile platform via the wireless communication system. In some examples, the mobile platform is associated with a carrier that defines the access profiles for the mobile platform, wherein the carrier is associated with a plurality of mobile platforms. In some examples, 805 may be performed at least in part by a network manager 1020, a content offering request manager 1015, and/or a transmitter 1095 as described in FIG. 10.

At 810, the method 800 may include maintaining a database of access profiles for accessing a network via the wireless communication system, wherein each of the access profiles corresponds to a respective content category of a plurality of content categories and is associated with a respective set of content sources available via the network. In some examples, 810 may be performed at least in part by an access profile database 1010 as described in FIG. 10.

At 815, the method 800 may include providing at least one device of the plurality of devices a respective set of content categories of the plurality of content categories for display based at least in part on a device-specific profile associated with the corresponding device. In some examples, the method 800 may further include identifying the respective set of content categories for each device of the plurality of devices. In some examples, 815 may be performed at least in part by the content offering request manager 1015 or a receiver 1090 as described in FIG. 10.

At 820, the method 800 may include receiving a request from a particular device of the plurality of devices for a particular content category of the respective set of content categories. In some examples, 820 may be performed at least in part by the content offering request manager 1015 or a receiver 1090 as described in FIG. 10.

At 825, the method 800 may include identifying an access profile from the database that is associated with the particular content category. In some examples, identifying the access profile further includes determining a preference of a user associated with the device, a characteristic of the user, a subscription status of the user, a profile of the user, demographic information of the user, group membership of the user, communication information associated with the user, a reservation number associated with the user, a ticket number associated with the user, or a combination thereof, wherein the access profile is identified based at least in part on the determined preference. In some examples, identifying the access profile may also include determining a traffic policy of the mobile platform, wherein the traffic policy is based at least in part on a characteristic of the mobile platform, a region of the mobile platform, a route of the mobile platform, or a combination thereof, wherein the plurality of content categories is based at least in part on the traffic policy. In some examples, the access profile defines a set of rules for the plurality of content categories offered at the particular device. In some examples, 825 may be performed at least in part by the device-specific profile manager 1025, the network manager 1020 or the access profile database 1010 as described in FIG. 10.

At 830, the method 800 may include permitting communications between the particular device and the respective set of content sources associated with the particular content category associated with the identified access profile. In some examples, permitting communications between the particular device and the respective set of content sources further includes streaming mobile data traffic associated with the particular content category to the particular device. In some examples, the particular content category is associated with a live event, and streaming the mobile data traffic further includes streaming multimedia content associated with the live event. In some examples, permitting communications between the particular device and the respective set of content sources further includes communicating mobile data traffic associated with the particular content category on beam resources of at least one satellite beam of a satellite communication system, wherein the wireless communication system comprises the satellite communication system. In some examples, 830 may be performed at least in part by the network manager 1020 as described in FIG. 10.

In some examples, the method 800 further includes receiving a request from a second device of the plurality of devices for a different content category of a different respective set of content categories and permitting communications between the second device and the different respective set of content sources associated with the different content category associated with a second access profile.

In some examples, the method 800 also includes receiving multimedia content associated with the particular content category from a content provider, wherein the content provider is external to the wireless communication system. Some examples include configuring the plurality of content offerings based on a characteristic of the mobile platform.

In other examples, the method 800 may also include determining the plurality of content offerings based at least in part on identifying information for at least one user associated with the device. This could be done with or without the device directly communicating the identifying information. For example, a preference profile may be built based on a past use of the device or another characteristic. The preference profile may be used to determine which services to allow the device to select from.

In additional examples, the method 800 further includes determining that the plurality of content categories complies with a digital rights management policy. In yet more examples, the plurality of content categories includes multimedia content from a plurality of different content providers.

In some examples, the method 800 further includes providing at least one device of the plurality of devices the respective set of content categories of the plurality of content categories further includes providing each device of the plurality of devices the respective set of content categories of the plurality of content categories for display based at least in part on a device-specific profile associated with the corresponding device.

In other examples, the method 800 may include maintaining a database of device-specific profiles, wherein each of the device-specific profiles is associated with a respective one of the plurality of devices. The method 800 may further include in response to receiving the request from the device, updating the device-specific profile that is associated with the device to include an indication of the request for the particular content offering from the device. In additional examples, the method 800 may also include permitting the communications if the indication of the request for the particular content offering is within the device-specific profile that is associated with the device.

Figure 9:
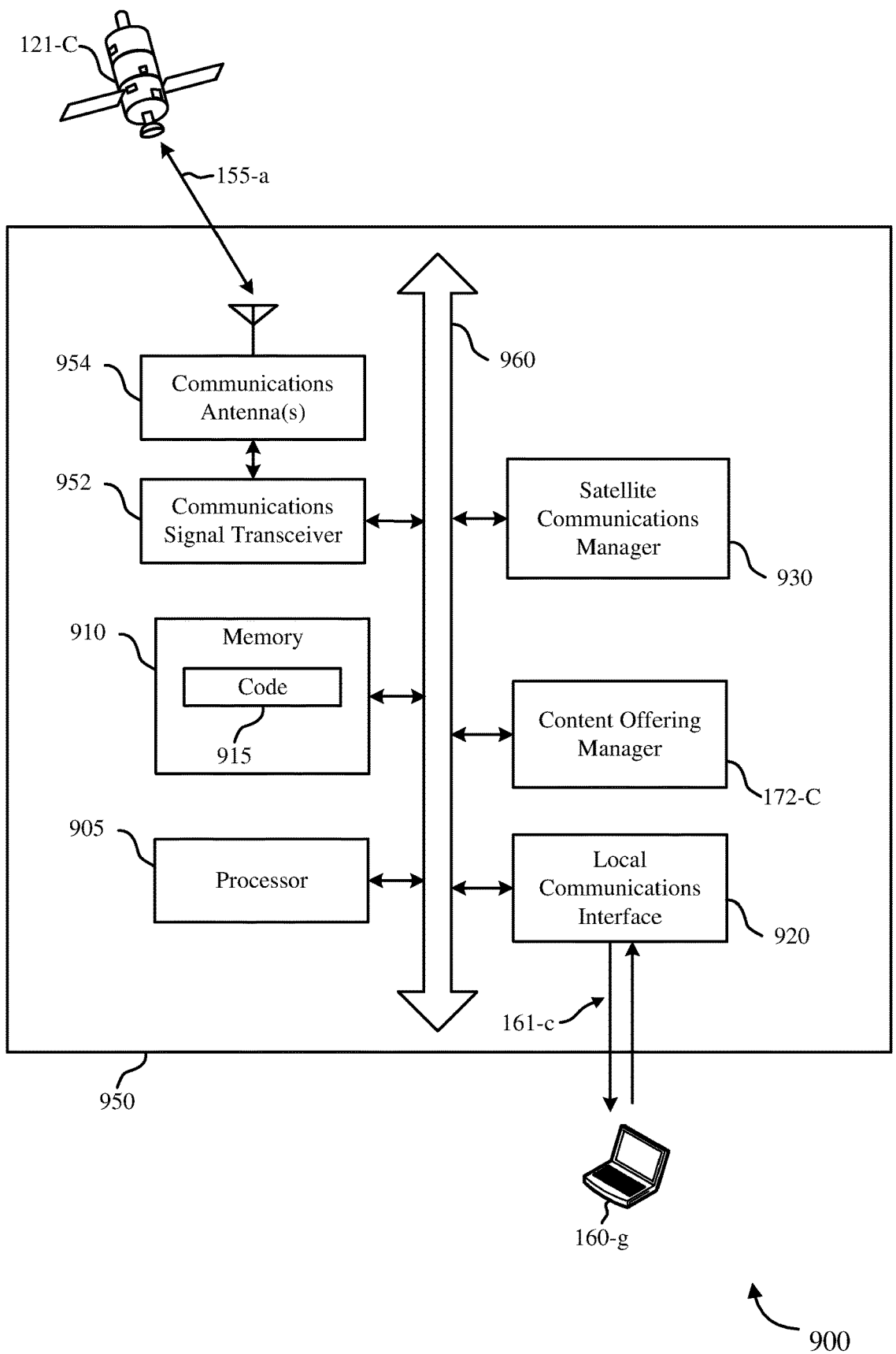
FIG. 9 shows a block diagram illustrating a satellite communications environment, in accordance with aspects of the present disclosure.

FIG. 9 shows a block diagram illustrating a satellite communications environment 900, in accordance with aspects of the present disclosure. The satellite communications environment 900 may be an example of the satellite communications environment 100 or 200 described with reference to FIG. 1 or 2, respectively. The satellite communications environment 900 includes a multi-user access terminal 950, satellite 121-c (for example as part of a satellite communication system), and a device 160-g. In some examples, the multi-user access terminal 950 may be an example of a satellite terminal 150 described with reference to FIGS. 1, or modem 270. In some examples, the multi-user access terminal 950 may be a single device, for example within a mobile platform such as an aircraft 230. In other examples, the features performed by the multi-user access terminal 950 may be divided or split between two or more devices.

The multi-user access terminal 950 may include a processor 905 and a memory 910. The memory 910 may store computer-readable, computer-executable software or firmware code 915 including instructions that, when executed by the processor, cause the multi-user access terminal 950 to perform various functions described herein. In some examples, the code 915 may not be directly executable by the processor but may cause a computer (e.g., when compiled and executed) to perform functions described herein. The processor 905 may include an intelligent hardware device (e.g., a central processing unit (CPU), a microcontroller, an application-specific integrated circuit (ASIC), etc.). Each of the components of the multi-user access terminal 950 may communicate, directly or indirectly, with one another (e.g., via one or more buses 960).

The multi-user access terminal 950 may be configured to communicate with one or more communications satellites (e.g., communications satellite 121-c), which may be an example of aspects of a communications satellite 121 of a satellite communications system as described with reference to FIGS. 1-3. The multi-user access terminal 950 may be configured to establish a communications link with the communications satellite 121-c employing a satellite terminal communications antenna 954 and a communications signal transceiver 952. The communications link may support bi-directional communications via signals 155-a between the multi-user access terminal 950 and the communications satellite 121-c.

The communications signal transceiver 952 may include various circuits and/or processors to support receiving, transmitting, converting, coding, and/or decoding of signals 155-a. For example, the communications signal transceiver 952 may include a modem to modulate the packets and provide the modulated packets to the satellite terminal communications antenna 954 for transmission, and to demodulate packets received from the satellite terminal communications antenna 954. As illustrated in the present example, the multi-user access terminal 950 includes a single satellite terminal communications antenna 954. However, in some cases the multi-user access terminal 950 may have more than one satellite terminal communications antenna 954, which may be capable of concurrently transmitting or receiving multiple wireless transmissions and/or be configured to support various beamforming techniques.

The multi-user access terminal 950 may include a content offering manager 172-c. Content offering manager 172-c may include various circuits and/or processors to support personalized content offerings. In some examples, content offering manager 172-c may include circuits and/or processors configured to receive a plurality of content offerings and apply the content offerings to a plurality of devices using device-specific profiles and access profiles.

Multi-user access terminal 950 may be configured to support communications with one or more devices 160-g via signals transmitted over wired and/or wireless connection(s) 161-c. Multi-user access terminal 950 may employ a local communications interface 920 supporting any number of wired and/or wireless links between the multi-user access terminal 950 and the one or more devices 160-g, which may be managed by a content offering manager 172-c. As illustrated by the present example, the content offering manager 172-c may implemented as a separate module of the multi-user access terminal 950, which may be configured as a standalone set of instructions (e.g., a software module having a set of instructions stored in memory, which may be a standalone portion of memory) and/or a separate processing element (e.g., a standalone CPU, microcontroller, ASIC, field-programmable gate array (FPGA), or other like integrated circuit (IC)). In other examples, some or all of the operations of the content offering manager 172-*c* may be caused by instructions stored in the memory 910 (e.g., a portion of the code 915), which in some examples may be performed by the processor 905.

Content offering manager 172-*c* may control and/or configure various components of the satellite terminal perform the one or more operations of the exemplary methods 500, 600, 700, or 800 described with reference to FIGS. 5-8.

Multi-user access terminal 950 may include a satellite communications manager 930, configured to manage various aspects of communications between the multi-user access terminal 950 and the communications satellite 121-*c*. As illustrated by the present example, the satellite communications manager 930 may implemented as a separate module of the multi-user access terminal 950, which may be configured as a standalone set of instructions (e.g., a software module having a set of instructions stored in a standalone portion of memory) and/or a separate processing element (e.g., a standalone CPU, microcontroller, ASIC, FPGA, or like IC). In other examples, some or all of the operations of the satellite communications manager 930 may be caused by instructions stored in the memory 910 (e.g., a portion of the code 915), which in some examples may include steps performed by the processor 905.

In various examples, the components of the multi-user access terminal 950 may be divided into subassemblies, where various components may be included in a subassembly either in part, or in its entirety.

FIG. 10 shows a block diagram 1000 of a content offering manager 172-*d*, in accordance with aspects of the present disclosure. The content offering manager 172-*d* may be a portion of any of a satellite terminal 150, a device 220, a communications satellite 121, a gateway 130, or a network device 141 as described with reference to FIGS. 1-3 and 9. For example, the content offering manager 172-*d* may be a portion of a satellite terminal 150, operating with a shared processor and memory of the satellite terminal 150. In another example the content offering manager 172-*d* may be a standalone component of a satellite terminal 150, receiving inputs from and sending outputs to other components of the satellite terminal 150. In other examples, the content offering manager 172-*d* may be or form a portion of a device 160, a communications satellite 121, a gateway 130, or a network device 141 which manages access rules for content offerings of one or more networks or content providers to a satellite communications system. The content offering manager 172-*d* may also be or include a processor. Each of the components of the content offering manager 172-*d* may be in communication with each other to provide the functions described herein. The content offering manager 172-*d* may be configured to receive signals from a receiver 1090, and deliver signals to a transmitter 1095 using various techniques, including wired or wireless communications, control interfaces, user interfaces, or the like.

The content offering manager 172-*d* may include an access profile database 1010, a content offering request manager 1015, a network manager 1020, a device-specific profile manager 1025, and a portal builder 1030. The access profile database 1010 may maintain one or more access profiles associated with different types of content and different network providers for that content. The access profiles may define one or more rules for accessing content items in a content offering. The rules may include prices, subscription requirements, age of a user requirements, device type requirements, necessary applications installed on the device, and the like.

The content offering request manager 1015 may perform one or more of the aspects of managing requests for particular content offerings from devices as described with reference to FIGS. 1-9. For example, the content offering request manager 1015 may receive, as inputs from the receiver 1090, a request for a content offering via the satellite communication system. In various examples, the content offering request manager 1015 may query the access profile database 1010 to determine whether the requested content offering is available to the requesting device.

The content offering manager 172-*d* may also include the network manager 1020, which may perform one or more of the aspects of managing a micro-session between a device and a network that provides access to the particular content item, as described with reference to FIGS. 1-9. The network manager 1020 may establish a session between the device and the network, forward the content item from the network to the device, and relay communications between them. The content offering manager 172-*d* may include a micro-session manager, which may perform one or more of the aspects of providing personalized content offerings, as described with reference to FIGS. 1-9. In some examples, the micro-session manager may facilitate a micro-session between the network and the device.

The content offering manager 172-*c* content offering manager 172-*d* may also include the device-specific profile manager 1025, which may manage a databased of profiles for one or more device associated with the mobile transport. For example, the device-specific profile manager 1025 may update the database based on which devices are located within or on the mobile transport. The database may also be updated based on characteristics of a user, or which user is logged into the device and what preferences and authorizations that user has.

The content offering manager 172-*d* may include a portal builder 1030, which may provide a portal to the device for requesting and accessing the one or more content offerings as described with reference to FIGS. 1-9. For example, the portal builder 1030 may determine which content offerings are applicable to a particular device, perhaps utilizing the access profile database 1010, and present a portal to the device. In some examples, the portal may be a GUI.

The components of the content offering manager 172-*d*, individually or collectively, may be implemented with at least one ASIC adapted to perform some or all of the applicable features in hardware. Alternatively, the features may be performed by one or more other processing units (or cores), on at least one IC. In other examples, other types of integrated circuits may be used (e.g., Structured/Platform ASICs, a FPGA, or another semi-custom IC), which may be programmed in any manner known in the art. The features may also be implemented, in whole or in part, with instructions embodied in a memory, formatted to be executed by one or more general or application-specific processors.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical positions. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for use in a wireless communication system, comprising:

providing a communication service to a plurality of devices within a mobile platform via the wireless communication system;

maintaining a database of access profiles for accessing a network via the wireless communication system, wherein each of the access profiles corresponds to a respective content category of a plurality of content categories and is associated with a respective set of content sources available via the network;

determining a traffic policy of the mobile platform, wherein the plurality of content categories is based at least in part on the traffic policy;

providing at least one device of the plurality of devices a respective set of content categories of the plurality of content categories for display based at least in part on a device-specific profile associated with a corresponding device;

receiving a request from a particular device of the plurality of devices for a particular content category of the respective set of content categories;

identifying an access profile from the database that is associated with the particular content category; and permitting communications between the particular device and the respective set of content sources associated with the particular content category associated with the identified access profile.

2. The method of claim 1, further comprising:

receiving a request from a second device of the plurality of devices for a different content category of a different respective set of content categories; and permitting communications between the second device and a different respective set of content sources associated with the different content category associated with a second access profile.

3. The method of claim 1, further comprising:
identifying the respective set of content categories for each device of the plurality of devices.

4. The method of claim 1, wherein permitting communications between the particular device and the respective set of content sources further comprises:
streaming mobile data traffic associated with the particular content category to the particular device.

5. The method of claim 4, wherein the particular content category is associated with a live event, and streaming the mobile data traffic further comprises:
streaming multimedia content associated with the live event.

6. The method of claim 1, wherein permitting communications between the particular device and the respective set of content sources further comprises:
communicating mobile data traffic associated with the particular content category on beam resources of at least one satellite beam of a satellite communication system, wherein the wireless communication system comprises the satellite communication system.

7. The method of claim 1, further comprising:
receiving multimedia content associated with the particular content category from a content provider, wherein the content provider is external to the wireless communication system.

8. The method of claim 1, wherein identifying the access profile further comprises:
determining a preference of a user associated with the particular device, a characteristic of the user, a subscription status of the user, a profile of the user, demographic information of the user, group membership of the user, communication information associated with the user, a reservation number associated with the user, a ticket number associated with the user, or a combination thereof, wherein the access profile is identified based at least in part on the determined preference.

9. The method of claim 1,
wherein the traffic policy is based at least in part on a characteristic of the mobile platform, a region of the mobile platform, a route of the mobile platform, or a combination thereof.

10. The method of claim 1, further comprising:
determining that the plurality of content categories complies with a digital rights management policy.

11. The method of claim 1, wherein the access profile defines a set of rules for the plurality of content categories offered at the particular device.

12. The method of claim 1, wherein the plurality of content categories includes multimedia content from a plurality of different content providers.

13. The method of claim 1, wherein providing at least one device of the plurality of devices the respective set of content categories of the plurality of content categories further comprises:
providing each device of the plurality of devices the respective set of content categories of the plurality of content categories for display based at least in part on a device-specific profile associated with the corresponding device.

14. A wireless communication system, comprising:
a satellite providing a communication service to a plurality of devices within a mobile platform via one or more satellite beams;
a database of access profiles for accessing a network via the wireless communication system, wherein each of the access profiles corresponds to a respective content category of a plurality of content categories and is associated with a respective set of content sources available via the network;
one or more processors;
memory in electronic communication with the one or more processors; and
instructions stored in the memory and executable by the one or more processors to cause the wireless communication system to:
maintain the database of access profiles;
provide at least one device of the plurality of devices a respective set of content categories of the plurality of content categories for display based at least in part on a device-specific profile associated with a corresponding device;
determine a traffic policy of the mobile platform, wherein the plurality of content categories is based at least in part on the traffic policy;
receive a request from a particular device of the plurality of devices for a particular content category of the respective set of content categories;
identify an access profile from the database that is associated with the particular content category; and
permit communications between the particular device and the respective set of content sources associated with the particular content category associated with the identified access profile.

15. The wireless communication system of claim 14, wherein the instructions are further executable by the one or more processors to cause the wireless communication system to:
receive a request from a second device of the plurality of devices for a different content category of a different respective set of content categories; and
permit communications between the second device and a different respective set of content sources associated with the different content category associated with a second access profile.

16. The wireless communication system of claim 14, wherein the instructions are further executable by the one or more processors to cause the wireless communication system to:
identify the respective set of content categories for each device of the plurality of devices.

17. The wireless communication system of claim 14, wherein the instructions to permit communications between the particular device and the respective set of content sources are further executable by the one or more processors to cause the wireless communication system to:
stream mobile data traffic associated with the particular content category to the particular device.

18. The wireless communication system of claim 17, wherein the particular content category is associated with a live event, wherein the instructions to stream the mobile data traffic are further executable by the one or more processors to cause the wireless communication system to:
stream multimedia content associated with the live event.

19. The wireless communication system of claim 14, wherein the instructions to permit communications between the particular device and the respective set of content sources are further executable by the one or more processors to cause the wireless communication system to:
communicate mobile data traffic associated with the particular content category on beam resources of at least one satellite beam of a satellite communication system, wherein the wireless communication system comprises the satellite communication system.

20. The wireless communication system of claim 14, wherein the instructions are further executable by the one or more processors to cause the wireless communication system to:

receive multimedia content associated with the particular content category from a content provider, wherein the content provider is external to the wireless communication system.

21. The wireless communication system of claim 14, wherein the instructions to identify the access profile are further executable by the one or more processors to cause the wireless communication system to:

determine a preference of a user associated with the particular device, a characteristic of the user, a subscription status of the user, a profile of the user, demographic information of the user, group membership of the user, communication information associated with the user, a reservation number associated with the user, a ticket number associated with the user, or a combination thereof, wherein the access profile is identified based at least in part on the determined preference.

22. The wireless communication system of claim 14, wherein the traffic policy is based at least in part on a characteristic of the mobile platform, a region of the mobile platform, a route of the mobile platform, or a combination thereof.

23. The wireless communication system of claim 14, wherein the instructions are further executable by the one or more processors to cause the wireless communication system to:

determine that the plurality of content categories complies with a digital rights management policy.

24. The wireless communication system of claim 14, wherein the access profile defines a set of rules for the plurality of content categories offered at the particular device.

25. The wireless communication system of claim 14, wherein the plurality of content categories includes multimedia content from a plurality of different content providers.

26. The wireless communication system of claim 14, wherein the instructions to provide at least one device of the plurality of devices the respective set of content categories of the plurality of content categories are further executable by the one or more processors to cause the wireless communication system to:

provide each device of the plurality of devices the respective set of content categories of the plurality of content categories for display based at least in part on a device-specific profile associated with the corresponding device.

* * * * *